Jan. 12, 1954     F. C. E. JOHANSSON ET AL     2,666,087
MANTLE FOR CONTINUOUS ELECTRODES
Filed July 12, 1952
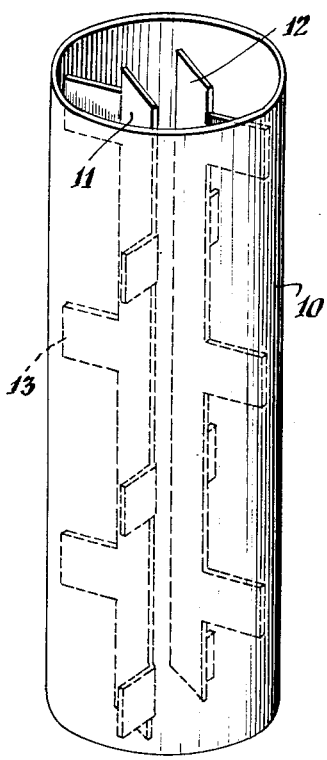
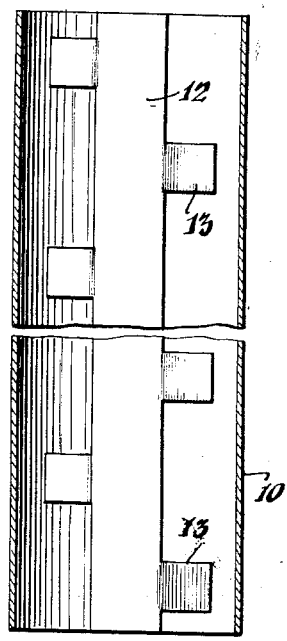
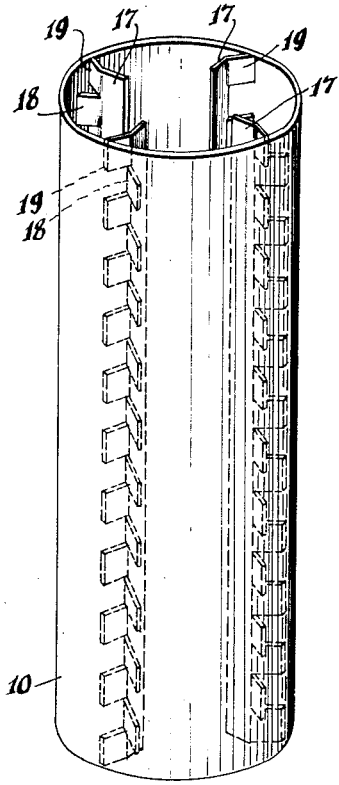
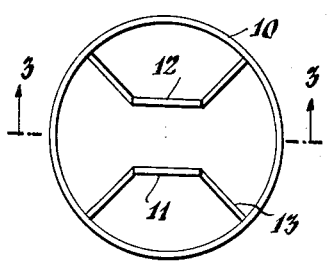
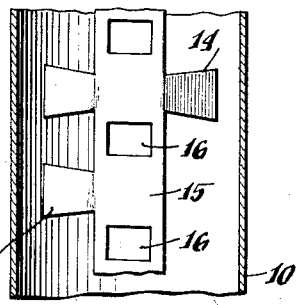
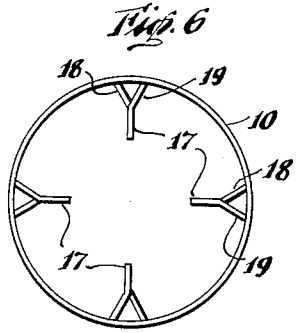
INVENTORS
Folke Carl Evald Johansson
Magnus Gustav Georg Tiberg
BY
Eyre Mann & Burrows
ATTORNEY Patented Jan. 12, 1954

2,666,087

UNITED STATES PATENT OFFICE 2,666,087

MANTLE FOR CONTINUOUS ELECTRODES

Folke Carl Evald Johansson, Borlange, and Magnus Gustav Georg Tiberg, Hallefors, Sweden, assignors to Elektrokemisk A/S, Oslo, Norway, a corporation of Norway Application July 12, 1952, Serial No. 298,536

Claims priority, application Sweden January 3, 1949

5 Claims. (Cl. 13—18)

This invention relates to continuous self-baking electrodes of the Soederberg type which are subjected to heavy mechanical strains as, for example, the relatively long electrodes used in closed furnaces or the electrodes used in steel furnaces and the like. The electrodes to which this invention relates are ordinarily used for furnaces in which high temperatures are developed as distinguished from low voltage electrodes used for electrolysis as, for example, in aluminum furnaces.

From the time of the first invention of the Soederberg electrode (see for example United States Patent No. 1,441,037 of January 2, 1923), it has been customary with electrodes of the type to which this invention relates to employ an outside casing or mantle for the electrode and at a very early date it was suggested that internal ribs be provided on such mantle to assist in carrying the electrical charge into the mass. The so-called electrode paste is introduced into the mantle where it is either packed in place or it is made of such consistency that when heated it will compact of itself without the necessity for tamping. The present invention relates to improvements on this type of electrode.

The constructions heretofore employed offered certain difficulties due to the fact that the iron ribs projecting in from the mantle, melt in the lower part of the electrode and leave continuous slots dividing the peripheral portion of the electrode into segments. It has also been noted that after the iron ribs melt away, corroding gases or flames go up through the residual slots and tend to enlarge them. Because of these factors the cross-section of the electrode is weakened and breakage may occur.

Another difficulty with the use of ribs as heretofore employed is that the iron has a much greater coefficient of elongation under heat than the baked electrode and this may cause cracking of the electrode. It has not been found feasible to do away with these ribs as they are needed to anchor the electrode mass to the casing to prevent slippage and also in order to introduce the electrical current into the mass.

According to the present invention we solve this difficulty by providing within the mantle and spaced away from it one or more thin plates or sheets which are intended to conduct current vertically through the electrode mass. Of course, some provision must be made for transmitting the electric current to these plates, and it is a feature of our invention that we transmit the current from the outside mantle to the internal plates by projections which are discontinuous in a vertical line but in the aggregate have a line of connection with the mantle which is at least equal to 30% and preferably to about 50% of the vertical length of the particular strip involved. To do this each strip has projections on one of both sides so that the projections are staggered, that is, one projection does not come directly below the next one above it but there is a gap between any two projections in a vertical line. We have found that this special arrangement gives very advantageous results in providing conductors which when they melt out do not form radial cracks running vertically in from the mantle for continuous lengths, and at the same time a conductive area is provided great enough for conducting the necessary current to bake the electrode mass within the mantle. Where the electrode body is a substantially continuous mass of material entirely filling a relatively thin mantle, if the central plates have a line of connection to the outer mantle less than about 30% of the vertical length of the plate, either the amount of electricity transmitted into the center of the electrode will not be great enough to bake the solid mass, or if the arrangements are such that a heavy load is transmitted toward the interior of the electrode the side connections may be burned out prematurely.

We have also found it advantageous to keep the conductors removed from the actual central portion of the electrode, as having metal down the center seems to unduly weaken the structure. For this reason we prefer to supply two or more plates each with a double row of staggered connections running to the outside mantle and with the plates preferably arranged symmetrically relative to the center of the electrode but not actually lying in such center.

The plate members themselves may be made continuous or they may be provided with openings through them at spaced intervals so that the electrode paste can close together through these openings. As an alternative other projections can be bent out from the central portions of the plates which will provide both for such holes and for additional contacts with the electrode mass. These plates usually will be of the same metal as the mantle or casing.

As regards the shape of the projections that connect the central plate-like members with the mantle, ordinarily they will be made rectangular. If they are made of irregular shape, we have found it somewhat advantageous to have the larger dimensions adjacent the mantle, as this makes for an efficient transfer of electrical power, that is, the larger area comes at the place where a formed connection has to be made.

Our invention may be readily understood by reference to the accompanying drawings in which Fig. 1 shows an electrode casing in perspective with the plates arranged on the inside; Fig. 2 shows a plan view of the same; Fig. 3 is a vertical section of the electrode along the line 3—3 of Fig. 2; Fig. 4 is likewise a vertical section through the electrode with flanges of slightly modified shape and with perforations in the plates; Fig. 5 is a perspective view similar to Fig. 1 but in this case the projections from the plates are extending from one edge instead of both edges and four plates are supplied which are arranged radially of the electrode and Fig. 6 is a plan view of the electrode of Fig. 5.

In these drawings the electrode consists of a sheet metal mantle 10 which is here shown of cylindrical shape into which the raw electrode mass is introduced. In Figs. 1 and 2 two plate members are supplied in the form of parallel bands 11 and 12 which extend in the longitudinal direction of the electrode within the cylindrical mantle 10. In these figures the connecting projections run from both edges of these plate-like members and are here designated by the numeral 13. It will be noted that in this figure the projections are spaced apart a distance equal to approximately three times the height of a projection so that in any vertical row the projections only take up about 25% of the height. However, staggered alternate projections extend from the other edge of each plate which are of the same shape as the projections first described so that the aggregate height of the projections in the two lines is equal to approximately 50% of the height of the plate 11 to which they are connected. In this case, as shown in Fig. 2, the plates 11 and 12 are arranged symmetrically relative to the center of the electrode but do not cross the center and the projections 13 are bent so that in the plan view they form radial lines spaced approximately 90° apart.

In Fig. 4 the projections 14 are made with a greater vertical dimension on the edge toward the mantle in order that the heating of the mantle at the welded seam shall not be too high. Also in Fig. 4 we show the plate member 15 (corresponding to members 11 and 12) as formed with holes 16 through it.

In Fig. 5 the mantle 10 is supplied with four separate plates 17 which are arranged radially and spaced at an angle of 90° from each other. Extending from a single edge of each plate 17 are two rows of projections 18 and 19 which are bent in alternate directions relative to the plate 17 so that in the plan view (Fig. 6) each of these plates with its projections forms a Y. It will be noted that in this case the aggregate line of contact between the projections and the mantle is substantially equal to 100% of the height of the plate but at the same time there is no vertical continuity in the projections directly adjacent to the mantle to form radial lines of weakness.

This application is a continuation-in-part of our earlier application, Serial No. 135,452, filed December 28, 1949.

What we claim is:

1. In a continuous electrode of the type described, the combination of a sheet metal mantle forming the outside of the electrode, electrode paste within such mantle and contacting the same, a plate-like metallic member within the mantle embedded within the paste, spaced projections connecting such member with the mantle along two spaced vertical lines, with the projections making contact along one of said lines being staggered relative to the projections making contact along the other of said lines and the aggregate of such lines of contact of said projections with the mantle equalling at least 30% of the length of the plate-like member with which they are connected.

2. A structure as specified in claim 1 in which the aggregate line of contact of said projections equals at least approximately 50% of the length of the plate-like member with which such projections are connected.

3. A structure as specified in claim 1 which includes a plurality of such plate-like members arranged substantially symmetrically within the mantle but no one of which lies directly within the center of the mantle.

4. In a continuous electrode of the type described, the combination of a sheet metal mantle forming an open-ended tube, continuous electrode paste in the tube directly contacting the interior of the tube so that the electric current transmitted to the mantle will be transmitted directly to the outer portion of the electrode mass, a plurality of plate-like members within the mantle extending substantially the length of the mantle embedded in the electrode mass and thin projections connecting each such member directly to the mantle at widely spaced points but with the lines along which contact of the projections from each of said members are connected to the mantle having an aggregate length equal to at least 30% of the length of such member so that electric current transmitted to the mantle will also be transmitted through the interior of the electrode mass without such mass being weakened by vertically continuous radial flanges extending inwardly from the mantle.

5. In a continuous electrode of the type described, the combination of a sheet metal mantle forming the outside of the electrode, electrode paste within such mantle, a plate-like metallic member within the mantle embedded within the paste, spaced projections connecting such member with the mantle along two spaced vertical lines, with the projections making contact along one of said lines being staggered relative to the projections making contact along the other of said lines, said projections making a larger line of contact with the mantle than with such plate-like member.

FOLKE CARL EVALD JOHANSSON.
  MAGNUS GUSTAV GEORG TIBERG.

References Cited in the file of this patent

UNITED STATES PATENTS

| Number | Name | Date |
|---|---|---|
| 1,440,724 | Soderberg | Jan. 2, 1923 |
| 1,613,212 | Westly | Jan. 4, 1927 |
| 1,774,674 | Sem | Sept. 2, 1930 |

FOREIGN PATENTS

| Number | Country | Date |
|---|---|---|
| 59,471 | Norway | June 13, 1938 |
| 132,133 | Sweden | Apr. 12, 1951 |
| 137,811 | Great Britain | Mar. 11, 1920 |
| 529,118 | Germany | July 10, 1931 |
| 805,898 | Germany | June 4, 1951 |